(12) United States Patent
Hagspiel et al.

(10) Patent No.: US 9,471,522 B2
(45) Date of Patent: Oct. 18, 2016

(54) RESOURCE ALLOCATION BY VIRTUAL CHANNEL MANAGEMENT AND BUS MULTIPLEXING

(71) Applicant: International Business Machines Corporation, Armonk, NY (US)

(72) Inventors: Norbert Hagspiel, Wendlingen (DE); Sascha Junghans, Ammerbuch (DE); Matthias Klein, Boeblingen (DE); Joerg Walter, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 14/096,574

(22) Filed: Dec. 4, 2013

(65) Prior Publication Data

US 2015/0154139 A1    Jun. 4, 2015

(51) Int. Cl.
*G06F 13/36* (2006.01)
*G06F 13/28* (2006.01)
*G06F 13/40* (2006.01)
*G06F 13/16* (2006.01)

(52) U.S. Cl.
CPC ......... *G06F 13/287* (2013.01); *G06F 13/1642* (2013.01); *G06F 13/1673* (2013.01); *G06F 13/1684* (2013.01); *G06F 13/4022* (2013.01)

(58) Field of Classification Search
CPC .. G06F 3/0659; G06F 3/0656; G06F 3/0604; H04L 12/46; H04L 12/4625; H04L 12/56; H04L 47/2433; H04L 47/76; H04L 47/821; H04L 49/25; H04L 47/50; H04L 47/6295
USPC ........................................................ 710/310
See application file for complete search history.

(56) References Cited

U.S. PATENT DOCUMENTS

| 4,783,739 | A  | * | 11/1988 | Calder .................. G06F 13/126 |
| | | | | 710/4 |
| 5,900,019 | A  | | 5/1999 | Greenstein et al. |
| 6,240,458 | B1 | * | 5/2001 | Gilbertson .............. G06F 13/14 |
| | | | | 709/232 |
| 6,260,099 | B1 | * | 7/2001 | Gilbertson .......... G06F 13/1657 |
| | | | | 710/112 |
| 6,393,506 | B1 | | 5/2002 | Kenny |

(Continued)

FOREIGN PATENT DOCUMENTS

| EP | 0326696 A2 | 8/1989 |
| WO | 2013101794 A1 | 7/2013 |

OTHER PUBLICATIONS

Hagspiel et al., "Resource Allocation by Virtual Channel Management and Bus Multiplexing," U.S. Appl. No. 14/927,055, filed Oct. 29, 2015.

(Continued)

*Primary Examiner* — Faisal M Zaman
(74) *Attorney, Agent, or Firm* — Nolan M. Lawrence

(57) ABSTRACT

According to embodiments of the invention, methods, computer system, and apparatus for virtual channel management and bus multiplexing are disclosed. The method may include establishing a virtual channel from a first device to a second device via a bus, the bus having a first bus capacity and a second bus capacity, the second bus capacity having greater capacity than the first bus capacity, determining whether a store command is issued for the first bus capacity, determining whether the first bus capacity is available, and allocating the second bus capacity and marking the second bus capacity as unavailable in response to the store command if the first bus capacity is unavailable.

3 Claims, 4 Drawing Sheets

(56) References Cited

U.S. PATENT DOCUMENTS

| | | | |
|---|---|---|---|
| 6,594,698 B1 | 7/2003 | Chow et al. | |
| 6,704,831 B1 | 3/2004 | Avery | |
| 7,796,585 B2 * | 9/2010 | Celebioglu | G06F 13/385 370/356 |
| 7,869,353 B2 * | 1/2011 | Bauchot | H04L 45/00 370/230 |
| 7,882,278 B2 | 2/2011 | Chadha et al. | |
| 8,787,368 B2 * | 7/2014 | Hughes | H04L 49/10 370/389 |
| 2006/0179182 A1 * | 8/2006 | Chadha | G06F 13/4059 710/29 |
| 2007/0083873 A1 | 4/2007 | Kavanaugh et al. | |
| 2010/0325318 A1 * | 12/2010 | Desoli | G06F 13/385 710/29 |
| 2013/0117474 A1 | 5/2013 | Ajanovic et al. | |
| 2014/0281191 A1 * | 9/2014 | Retter | G06F 13/1694 711/105 |
| 2014/0344488 A1 * | 11/2014 | Flynn | G06F 5/14 710/52 |

OTHER PUBLICATIONS

IBM, "zEnterprise 196 System Overview," Edition SA22-1086-03, 202 pages, © Copyright IBM Corporation 2010, 2012. http://www-01.ibm.com/support/docview.wss?uid=isg2c24bd608371def3985-25776100545fcb&aid=1.

* cited by examiner

RESOURCE ALLOCATION BY VIRTUAL CHANNEL MANAGEMENT AND BUS MULTIPLEXING

BACKGROUND

The present disclosure relates to the field of virtual channel management.

Devices may be used within a communications environment such as a computing environment, to facilitate communications between various components of the environment. For example, a first device may be coupled to a second device and where the devices may communicate via a system bus. Various types of buses and channels may be used to facilitate communication between the devices, and as devices in computer systems have increased functionality and complexity, the need to effectively and efficiently communicate between devices similarly increases.

SUMMARY

The present disclosure relates to virtual channel management which may include multiplexing techniques. A method of virtual channel management may include establishing a virtual channel from a first device to a second device via a bus. The bus may have a first bus capacity and a second bus capacity, where the second bus capacity may be larger than the first bus capacity. The method may further include determining whether a channel command is issued for the first bus capacity, and determining whether the first bus capacity is available. The method may also include allocating the second bus capacity and marking the second bus capacity as unavailable in response to the channel command if the first bus capacity is unavailable.

The method of virtual channel management may further include determining whether the second bus capacity is available and if so, marking the second bus capacity as available. The first bus capacity may include a store buffer and a store state machine and the second bus capacity may include a store/fetch buffer and a store/fetch state machine. The channel command may be a store command. The ratio of the capacity of the second bus capacity to the first bus capacity may be about four to one. The method of virtual channel management may further include controlling the flow of channel commands from the first device to the second device. The flow may be controlled by a process including adding a credit to the virtual channel and subtracting the credit if a store command is issued on the virtual channel, wherein the credit allows commands to be issued on the virtual channel. The bus may be a peripheral component interconnect express bus.

A method of virtual channel management may also include establishing a virtual channel from a first device to a second device via a bus, the bus having a store/fetch resource. The method may include determining whether a store command is issued on the virtual channel, and allocating a store/fetch resource and marking the store/fetch resource as unavailable in response to the store command.

The method may also include determining whether the store/fetch resource allocated is available and if so, marking the store/fetch resource as available. The bus may have a store resource and may further include allocating the store resource and marking the store resource as unavailable in response to the store command.

The store/fetch resource may be allocated and marked as unavailable in response to the store command if the store resource is unavailable. The store/fetch resource may include a store/fetch buffer and a store/fetch state machine. The bus may have one or more store resources and one or more store/fetch resources and the ratio of store resources to store/fetch resources may be about four to one. The resources may be allocated in a ratio equal to the ratio of store resources to store/fetch resources.

A system of bus multiplexing may include a bus, a first device, and a second device. The first and second devices may be communicatively connected to the bus. The bus may have a controller, a store resource and a store/fetch resource. The controller may be configured to determine whether a store command is issued on the virtual channel, to allocate a store/fetch resource, and to mark the store/fetch resource as unavailable in response to the store command.

The controller may be further configured to allocate the store resource and mark the store resource as unavailable in response to the store command. The store/fetch resource may be allocated in response to the store command if the store resource is unavailable and the store/fetch resource is marked as unavailable. The store/fetch resource may include a store/fetch buffer and a store/fetch state machine and the store resource may include a store buffer and a store state machine. The bus may be a peripheral component interconnect express bus.

DETAILED DESCRIPTION

Figure 1:
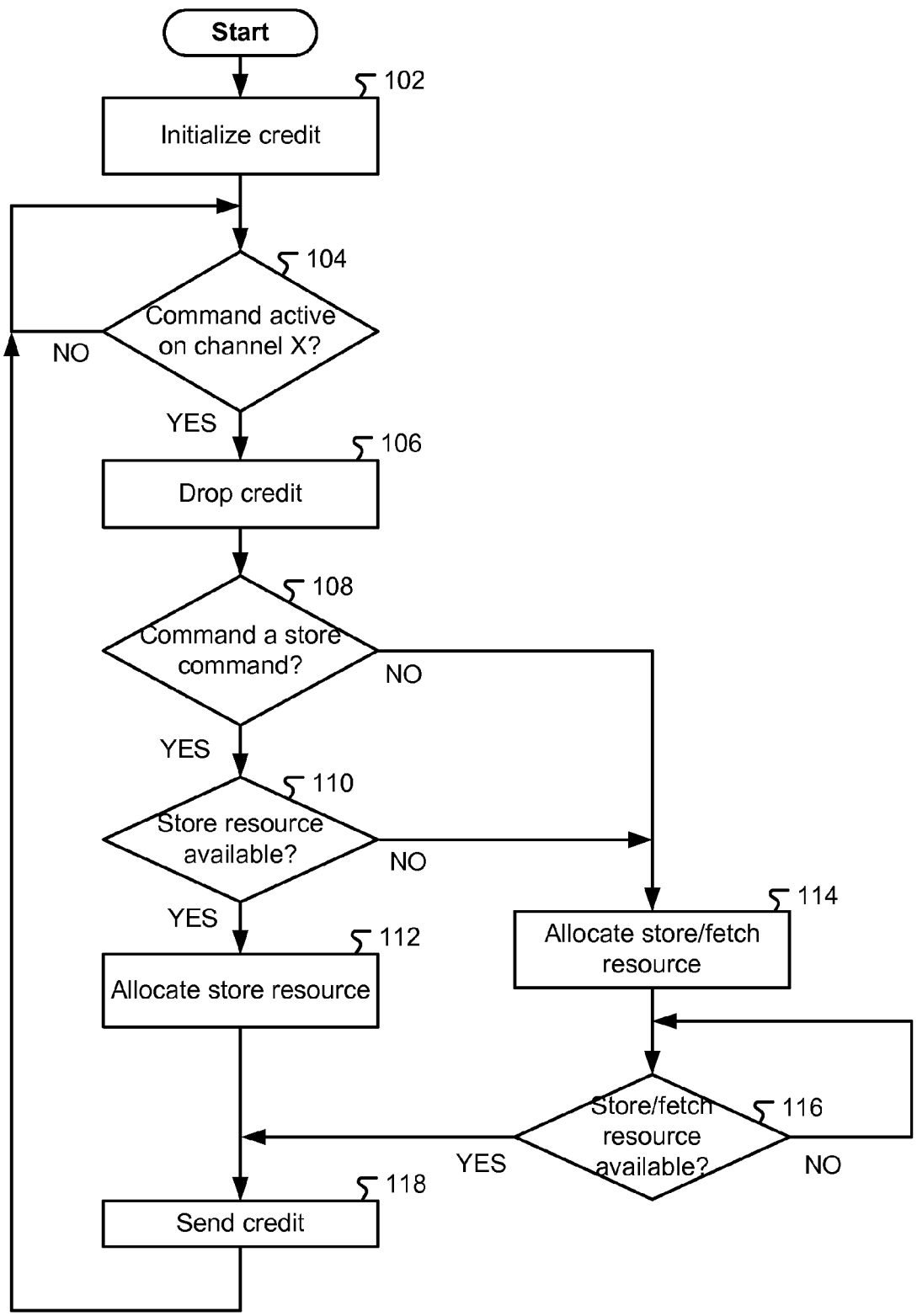
FIG. 1 depicts a flow diagram of an embodiment of a method of virtual channel management which may allocate store/fetch resources in response to store commands, consistent with embodiments of the present disclosure.

In the following description, reference is made to the accompanying drawings illustrating various examples by which the disclosure may be used. Other examples of the disclosure may be used, as structural and operational changes may be made without departing from the scope of the present disclosure.

While the same nomenclature and same numbers may be used to identify elements throughout the disclosure, this practice is not intended to limit the scope of the disclosure. Identified elements in one figure may not be identical to other same named or identified elements in other figures.

The present disclosure relates to virtual channel management which may include techniques for bus multiplexing. More specifically, the present disclosure relates to virtual channel management from a first device to a second device across a bus, where a virtual channel may have access to store resources and store/fetch resources to facilitate communication between the first device and the second device.

Computer systems may comprise a co-operating collection of devices. For example, a first device such as a logic device may be responsible for many of the functions of a computer system. A logic device may use data to perform many of the computer system's functions. Data may be transmitted to and received by the logic device from various external sources. External sources may include a second device. For example, storage systems, cache memory, processors, user input devices, output devices such as speakers and video screens, graphics processing devices, networking devices, or other devices may be connected to the logic device and may transmit to and receive data from the logic device. However, it is contemplated that the first device and second device may include other types of devices, and includes devices besides logic devices.

Buses may communicatively connect devices in a computer system. A bus may provide a channel or channels of communication for transmission of data between a first device and a second device. Various types of buses may connect the first and second devices including small computer system interface (SCSI) buses, universal serial buses (USB), peripheral component interconnect (PCIe) buses, and other suitable types of buses. As devices implemented in computer systems have increased in complexity and functionality, some devices may include self-contained computing systems to perform multiple functions. These multifunction devices may generally employ multiplexers to utilize independent channels for communication across the bus between each function of the multifunction device to another device.

A central interconnect module (hereinafter referred to as "central interconnect") may be used to facilitate the communication between the first device and the second device. The central interconnect may be used to route communications across the bus. The central interconnect may be an aspect of the bus. The central interconnect may have capacity including a first bus capacity and a second bus capacity. The first and second capacity may be different sizes. In an embodiment, the second bus capacity may be larger than the first bus capacity. The bus capacity may be used in the transfer of data between the first and second devices as temporary storage, to perform tests, or to perform other functions. The first and second bus capacity may include buffers, state machines, controllers, memory or other elements.

The central interconnect may also implement virtual channel management in order to create virtual channels for each independent channel between the devices. Virtual channels may allow for peer-to-peer relationships between the device and the logic device and may allow for dynamic creation and termination of the virtual connection. Virtual channels may be established by a virtual channel management bus driver, which may allow for a number of simultaneous channels to be created. Each virtual channel may consist of a stream of bytes transferring data to and from the computer device. The virtual channels may flow over the physical bus and may be used to segregate various commands to the device by mapping the command onto a particular stream. For example, communication between a first device and a second device having device memory may use four virtual channels to differentiate channel commands. The channel commands may include, but is not limited to, commands to store data and to store/fetch data to and from the device memory.

In an example, four virtual channels are used to differentiate channel commands to store data or to store/fetch data to and from memory. Store type commands may be communicated exclusively on a first virtual channel, and store/fetch type commands may be communicated exclusively on a second virtual channel. Store commands may signal to a device to write to a memory location within the device. Store/fetch commands may be a test and set instruction to write to a memory location and return its old value as a single atomic operation.

Store commands may be used more often than store/fetch commands, and thus store/fetch resources for implementation of the store/fetch commands may often be idle. In an embodiment, the first bus capacity may be used to execute store commands and the second bus capacity may be used to execute store/fetch commands. In another embodiment, the second bus capacity may be used to execute store commands as store commands may require fewer resources available to perform store/fetch commands. The store/fetch resources may use power, physical space, wiring, and bandwidth in a computer system which may be more efficiently used in other processes in the computer system. The second bus capacity may include store/fetch resources allowing the second bus capacity to execute store/fetch commands. The first bus capacity may include store resources allowing the first bus capacity to execute store commands.

In distinction to two or more virtual channels which segregate store commands and store/fetch commands, a central interconnect may employ a single virtual channel for both store type commands and store/fetch type commands. A method of virtual channel management may include establishing a virtual channel from a first device to a second device via a bus. The bus may have a first bus capacity and a second bus capacity, where the second bus capacity may be larger than the first bus capacity. The method may further include determining whether a channel command is issued for the first bus capacity. The method may also include determining whether the first bus capacity is available, and allocating the second bus capacity and marking the second bus capacity as unavailable in response to the channel command if the first bus capacity is unavailable.

Referring now to FIG. 1, a flow diagram of an embodiment of a method 100 of virtual channel management may be seen. In operation 102 a credit may be initialized. The central interconnect may employ a credit based flow-control system. In an example, a credit based system may be employed with a bus and a central interconnect, where a first device is connected via the bus and central interconnect to a second device. The credit based system may function so that the central interconnect advertises an initial amount of credit for each available resource in the bus's transaction layer. A first device may send transaction layer packets to the second device, and the first device may count the number of credits each transaction layer packet consumes. The first device may limit transmission of data such that a transmission does not make the consumed credit count exceed credit limit in the central interconnect. When the second device finishes processing the transaction layer packet from its resources, it may signal a return of credits to the first device which may increase the credit limit by the restored amount.

In an embodiment, the first device and the second device may transmit and receive a first command and second command via the bus and the central interconnect. The central interconnect may have capacity including a first bus capacity and a second bus capacity. The bus capacity may also include one or more resources. The first bus capacity may have one or more first resources and the second bus capacity may have one or more second resources. The resources may include buffers, state machines, or other elements within the bus capacity. The central interconnect may advertise a number of credits equal to the number of resources. In an embodiment, the first and second commands may be store commands and store/fetch commands respectively. The first and second resources may be store resources and store/fetch resources respectively. In an embodiment, the central interconnect may advertise a number of credits equal to the number of store/fetch resources.

In decision block 104, if a command is active on the virtual channel then the method 100 may progress to operation 106 and the credit may be dropped. A command may include instructions between the devices. For example, a command from the first device may be a store command instructing the second device to receive and store data from the first device in memory in the second device. A command from the first device may also be a store/fetch command instructing the second device to store data and to transmit data from the second device to the first device. In an embodiment, the store/command may be a test & set command. In various embodiments, the store/fetch command and other types of commands may be an atomic memory operation.

The commands may be executed by the resources. In an embodiment, the store resources may execute store commands and the store/fetch resources may execute store/fetch commands. In another embodiment, store/fetch resources may be used to execute store commands as store commands may require fewer resources available to perform store/fetch commands. If a command is not active on the virtual channel then, in decision block 104, the method 100 may wait and repeat decision block 104 until a command is issued.

In decision block 108, if the command is a store command then the method 100 may progress to decision block 110. In decision block 110, if a store resource is available, then the method 100 may progress to operation 112 and a store resource may be allocated on the virtual channel. Store resources may include memory, logic, wiring, power, physical space, components or other elements. In an embodiment, the resources may be part of the central interconnect. However, in another embodiment, the resources may be part of the devices or in another suitable location.

In an embodiment, the store resources may include one or more buffers and one or more state machines. In response to a store command, data transmitted to the device may be temporarily stored in a buffer. Buffers may be implemented in a fixed memory location in hardware or may be implemented using a virtual data buffer in software which may point at a location in the physical memory. The data stored in the buffer may be stored on a physical storage medium. State machines may be used to provide instructions or logic to control the buffers. In an embodiment, a state machine may be used to control the transmission and reception of data to the device and the logic device and may control the storage and transmission of data from the buffer.

After the store resource is allocated, in operation 118 a credit may be issued on the central interconnect. Under a credit based flow control system, credits may be issued to the extent of resources available to handle commands. Thus the first device may limit transmission of data so that transmission does not make the credit count exceed credit limit in the central interconnect. When the second device finishes processing the transaction layer packet from its resources, it may signal a return of credits to the first device which may increase the credit limit by the restored amount and allow further commands to be issued.

In decision block 108, if the command is not a store command then the command may be a store/fetch command and the method 100 may progress to operation 114 and allocate a store/fetch resource. Store/fetch resources may include memory, logic, wiring, power, physical space, or other elements. In an embodiment, resources may be part of the central interconnect. However, in another embodiment, the resources may be part of the devices or in another suitable location. The central interconnect may have store/fetch resources including one or more buffers and one or more state machines. The buffers and the state machines may be the same or substantially similar as described above with regard to store resources. However, store/fetch buffers may have a capacity as large as or larger than the store buffers as store/fetch commands may generally require movements of greater amounts of data.

In decision block 110, if a store resource is not available, then the method 100 may progress to operation 114 and a store/fetch resource may be allocated on the virtual channel. Store/fetch resources may include memory, logic, wiring, power, physical space, or other attributes of the central interconnect. In an embodiment, resources may be part of the central interconnect. However, in another embodiment, the resources may be part of the devices or in another suitable location. In an embodiment store/fetch resources may be used in response to store commands as store commands may require fewer resources available to perform store/fetch commands.

If a store/fetch resource is available after the allocation in operation 114 then, in decision block 116, the method 100 may progress to operation 118 and a credit may be issued on the virtual channel. Under a credit based flow control system, the first device may limit transmission of data such that transmission does not make the consumed credit count exceed credit limit in the central interconnect. Thus, when the second device finishes processing the transaction layer packet from its resources, it may signal a return of credits to the first device which may increase the credit limit by the restored amount. If a store/fetch resource is not available then, in decision block 116, the method 100 may wait and repeat decision block 116 until a store/fetch resource is available. In an embodiment, state machine may place the central interconnect in a waiting state until the store/fetch resource allocated is free or until sufficient credit is issued on the virtual channel.

Figure 2:
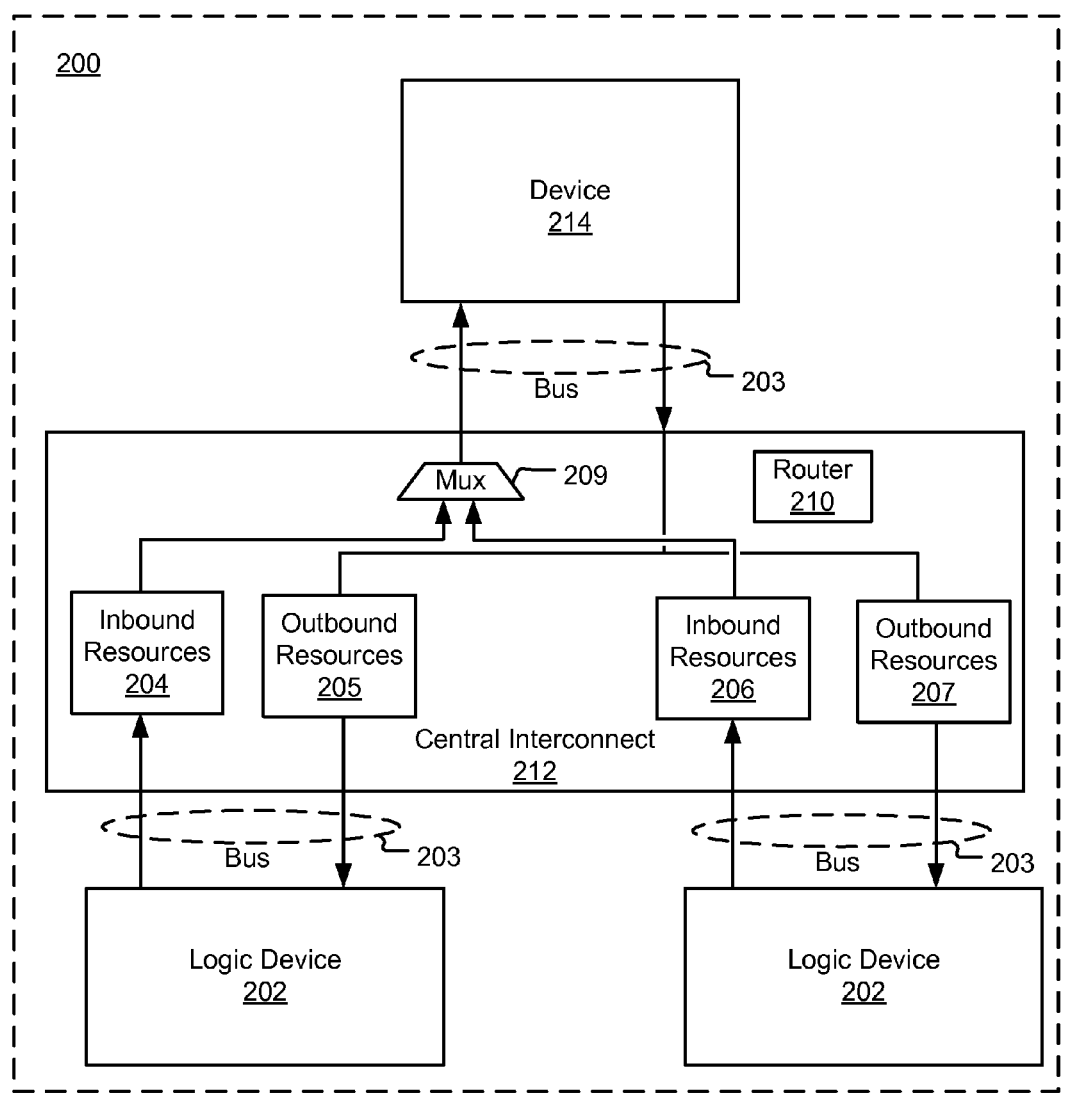
FIG. 2 depicts an embodiment of a system for virtual channel management having logic devices and a device connected via a bus and a central interconnect, consistent with embodiments of the present disclosure.

Referring now to FIG. 2, an embodiment of a computer system 200 for bus multiplexing may be seen. The computer system 200 may be used to execute the method described above. One or more logic devices 202 may be communicatively connected to a device 214, through buses 203. The buses 203 may have a central interconnect 212 which may bridge the logic devices 202 to a device 214. The central interconnect 212 may have inbound resources 204, 206 and outbound resources 205, 207. The central interconnect 212 may be configured to establish a virtual channel from the one or more logic devices 202 to the device 214, to provide a credit to the virtual channel, where the credit allows commands to be issued on the virtual channel.

The central interconnect 212 may be further configured to determine if a store command is on the virtual channel, to drop the credit if a store command is on the virtual channel, to allocate a store/fetch resource, and to mark the store/fetch resource as unavailable if the determined command is a store command. The central interconnect 212 may also be configured to determine whether a credit is on the virtual channel and to and provide the credit on the virtual channel when the store/fetch resource is available.

The logic device 202 may include various types of logic devices 202 such as digital circuits, radio frequency circuits, application specific integrated circuit (ASIC) processors, field programmable gate arrays (FPGA), or other type of logic circuit. The device 214 may include various types of computer components which transmit and receive data. In an embodiment, the device may be L3 cache which is connected to a processor. In another embodiment the device may include storage systems, processors, user input devices, output devices such as speakers and video screens, graphics processing devices, networking devices, or other devices. The bus 203 may provide a communicative pathway from the logic device 202 to the device 214. The bus may be various types of buses, including small computer system interface (SCSI) buses, universal serial buses (USB), peripheral component interconnect (PCIe) buses, and ASIC interface buses (AIB).

The central interconnect 212 may provide a bridge for transmission of data between the device 214 and the logic devices 202. In an embodiment, the central interconnect may be a PCIe bus controller. However, in another embodiment, the central interconnect may include other types of bus controllers. The central interconnect 212 may support an N-to-1 inbound data path and a 1-to-N outbound data path. I.e., inbound data from multiple logic devices 202 is routed through the central interconnect 212 and transmitted to the device, or inbound data from the device 214 is routed through the central interconnect 212 and transmitted to the logic devices 202.

For each path running between a pair of components which is supported by the central interconnect 212, the central interconnect may contain a respective inbound resources 204, 206 and outbound resources 205, 207. Inbound resources 204, 206 feed multiplexer 209. Outbound data arriving in the central interconnect may be routed by router 210 to appropriate outbound resources 205, 207. In an embodiment, the resources 204, 205, 206, 207 may include one or more buffers and one or more state machines. Placing resources 204, 205, 206, 207 in the central interconnect 212 may reduce the number of resources required and the number of resources which must be traversed by data passing through the system 200. While resources 204, 205, 206, 207 may be contained within the central interconnect 212, it is possible that the resources 204, 205, 206, 207 may be placed in each of the functional components, such as the logic devices 202 and the device 214.

Figure 3:
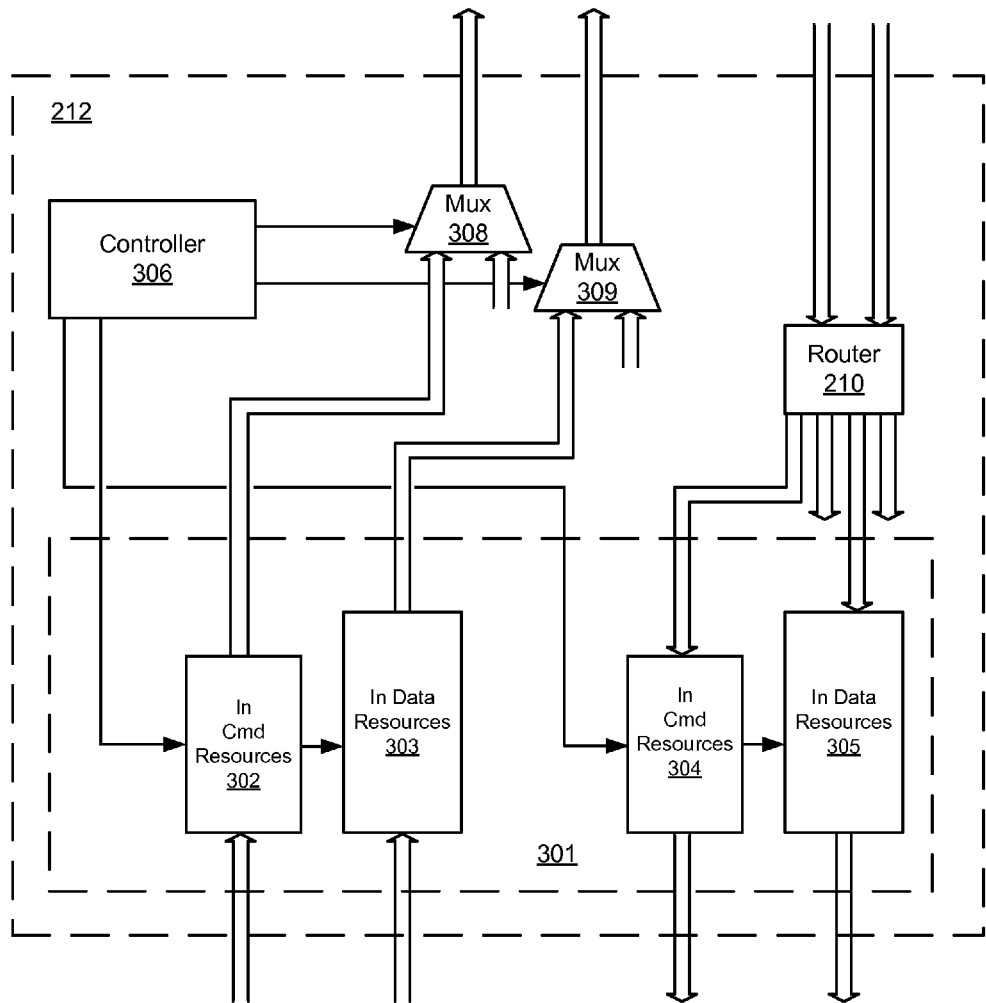
FIG. 3 depicts an embodiment of a central interconnect, consistent with embodiments of the present disclosure.

Referring now to FIG. 3, an embodiment of a central interconnect consistent with embodiments of the present disclosure may be seen. Illustratively, a simplified representation of the major components of the resources and associated data paths within central interconnect 212 are included. The central interconnect 212 may have resources associated with a port 301 coupled to an outbound bus. However, it is contemplated that the central interconnect 212 may contain multiple ports coupled to an outbound bus. The port 301 may contain inbound command resources 302, inbound data resources 303, outbound command resources 304, and outbound data resources 305.

The central interconnect 212 may include a include multiplexers 308, 309, corresponding to the command bus and data bus respectively, a router 210, which may route received data to the inbound command resources 304 and the inbound data resources 305, and controller 306. The controller 306 may provide configuration information to router 210, multiplexers 308, 309, and to the channel arbiters 306, 307. Controller 306 may contain programmable information for determining resource allocation, priority determinations routing and arbitration selection for data transactions. In an embodiment, the controller 306 may also allow control of the number of virtual channels, perform credit based flow control calculations, assign different types of transactions to different channels, vary the resources allocated to different channels, and specify different priorities and arbitration functions for different channels.

Resources 302, 303, 304, 305 may include one or more buffers and one or more state machines. The buffers and the state machines may be the same or substantially similar as the buffers and state machines as described above. The buffers may include store buffers and store/fetch buffers. Buffer space may be allocated among a single virtual channel. A single channel may increase efficiency of allocating resources in response to store commands and store/fetch commands. The size of the buffer portions may be individually programmable for each data path, and each buffer, and the size of the channels. Configuration information concerning the sizes of the buffer space portions may be contained in controller 306.

Figure 4:
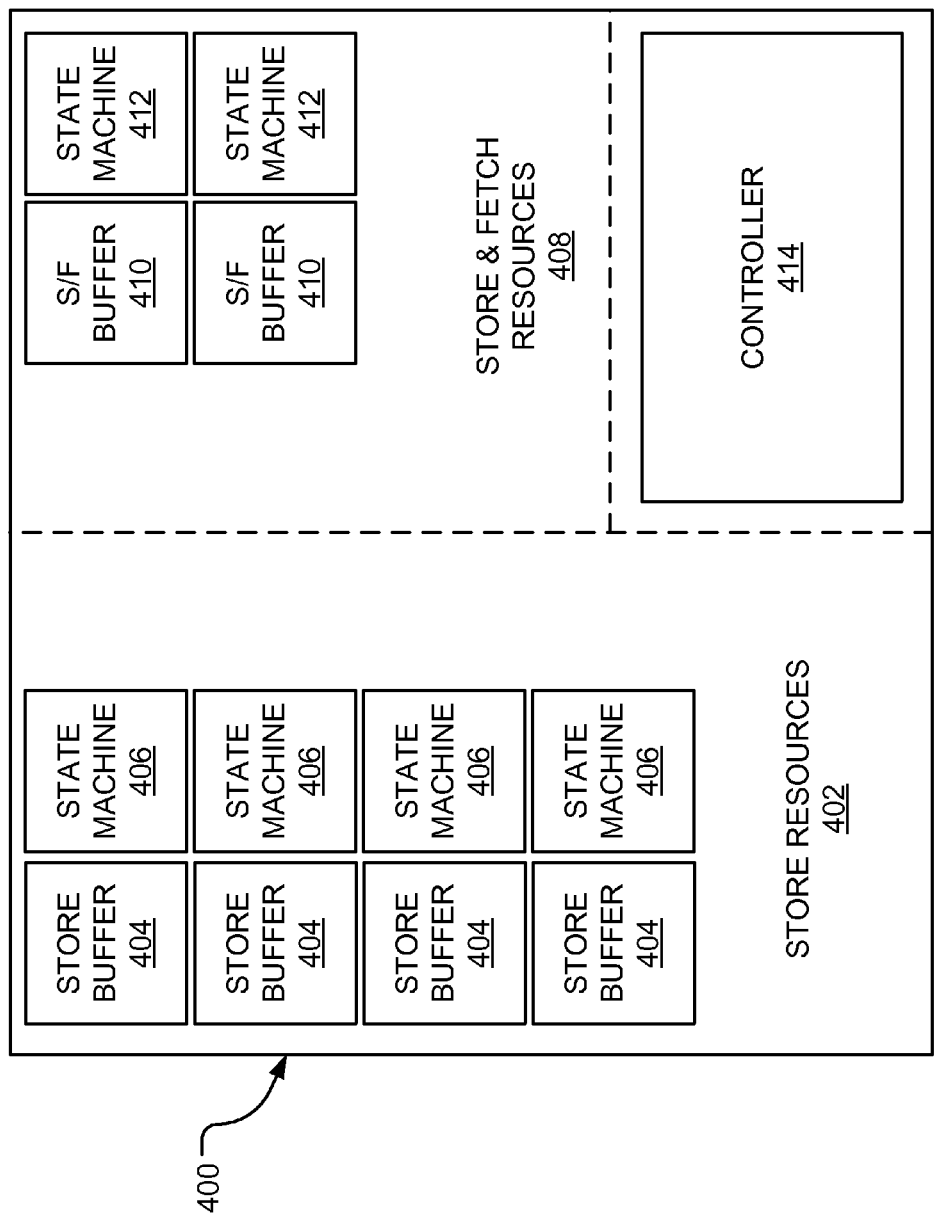
FIG. 4 depicts an embodiment of resources having store resources, store/fetch resources, and a controller, consistent with embodiments of the present disclosure

Referring now to FIG. 4, resources 400 for virtual channel management consistent with embodiments of the present disclosure may be seen. The resources 400 may include store resources 402 and store/fetch resources 408. The store resources may include one or more buffers 404 and one or more state machines 406. The store & fetch resources may include one or more buffers 410 and one or more state machines 412. The store and store/fetch buffers 404, 410 and the store and store/fetch state machines 406, 412 may be the same or substantially similar as described above.

In an embodiment, a central interconnect may allocate resources 400 in response to store commands and store/fetch commands. The resources may be allocated on a single virtual channel in response to both types of commands. Store/fetch resources 408 may generally be allocated in response to store commands as the store/fetch buffers 410 may generally have a capacity as large as or larger than the store buffers 404. While it would be possible to make all of the resources 400 store/fetch resources 404, the size of the store/fetch resources may decrease the number of available buffers and may decrease efficiency of the central interconnect. Thus, the central interconnect may have a ratio of resources 400, specifically a ratio of store resources 402 to store/fetch resources 404. In an embodiment, the ratio of store resources 402 to store/fetch resources may be about four to one, which may include ratios such as three to one, five to one, or in between. The resources 400 may also include a controller 414.

The controller may contain programmable information for determining resource allocation, priority determinations routing and arbitration selection for data transactions. The controller may also control allocation of store resources 402 and store/fetch resources 408. For example, a central interconnect may utilize credit based flow control where the number of credits is equal to the number of store/fetch resources 408. If all store/fetch resources 408 are allocated then no credit may be returned and no further command may be issued. The controller may interleave allocation of store resources and store/fetch resources. In an embodiment, the resources 400 may be interleaved such that the resources are allocated in a ratio equal to the ratio of number of store resources 402 to the store/fetch resources 408.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined in view of what would be apparent to those skilled in the art from the description provided herein and the claims appended hereto.

We claim:

1. A system of bus multiplexing comprising:
a physical bus, the physical bus facilitating communication between a first device and a second device, the physical bus including:
   at least one store command resource for sending store commands from the first device to the second device,
   at least one store/fetch command resource for sending store commands from the first device to the second device, the at least one store/fetch command resource also for sending store/fetch commands from the first device to the second device;
a central interconnect communicatively coupled to the physical bus, the central interconnect configured to manage the at least one store command resource and the at least one store/fetch command resource as a single virtual channel, the single virtual channel capable of receiving and handling store commands and store/fetch commands, the central interconnect configured to:
   receive, from the first device and via the physical bus, a first command;
   determine that the first command is a first store command;
   check, in response to the determined first store command, that the at least one store command resource is allocated to perform another command;
   determine that the at least one store command resource is allocated;
   check, in response to the determined allocated store command resource, that the at least one store/fetch command resource is allocated to perform another command;
   determine that the at least one store/fetch command resource is not allocated; and
   allocate, in response to the determination that the store/fetch command resource is not allocated and via the physical bus, the store/fetch command resource to send the determined first store command to the second device.

2. The system of claim 1, wherein the at least one store command resource is a plurality of store command resources, and wherein the at least one store/fetch command resources is a plurality of store/fetch command resources, and wherein the ratio of the plurality of store command resources to the plurality of store/fetch command resources is between three to one and five to one.

3. A system of bus multiplexing comprising:
a physical bus, the physical bus facilitating communication between a first device and a second device, the physical bus including:
   a first command resource, the first command resource capable of sending store commands from the first device to the second device,
   a second command resource, the second command resource capable of sending store commands from the first device to the second device,
   a third command resource, the third command resource capable of sending store commands from the first device to the second device, the third command resource capable of sending store/fetch commands from the first device to the second device,
   a fourth command resource, the fourth command resource capable of sending store commands from the first device to the second device, the fourth command resource capable of sending store/fetch commands from the first device to the second device;
a central interconnect communicatively coupled to the physical bus, the central interconnect configured to:
   manage the first command resource, the second command resource, the third command resource, and the fourth command resource as a single virtual channel;
   allocate, in response to receiving a first store command, the first command resource of the single virtual channel to send the first store command;
   interleave, in response to receiving a second store command, the third command resource of the single virtual channel to send the second store command;
   allocate, in response to receiving a third store command, the second command resource of the single virtual channel to send the third store command; and
   allocate, in response to receiving a fourth store command, the fourth store command of the single virtual channel to send the fourth store command.

* * * * *